United States Patent
Barclay et al.

[11] 3,900,365
[45] Aug. 19, 1975

[54] FLUID SHUT-DOWN SYSTEM FOR A NUCLEAR REACTOR

[75] Inventors: Francis W. Barclay; J. Richard Frey, both of Pinawa; James N. Wilson; Robert W. Besant, both of Saskatoon, all of Canada

[73] Assignee: Atomic Energy of Canada Limited, Ottawa, Canada

[22] Filed: Oct. 5, 1973

[21] Appl. No.: 403,794

[30] Foreign Application Priority Data
Oct. 10, 1972 Canada .................. 153528

[52] U.S. Cl. .................. 176/22; 176/86 L
[51] Int. Cl. .................. G21c 7/22
[58] Field of Search ........ 176/86 L, 86 M, 36 R, 22

[56] References Cited
UNITED STATES PATENTS

| | | | |
|---|---|---|---|
| 3,414,476 | 12/1968 | Galli de Paratesi et al. | 176/86 L |
| 3,498,881 | 3/1970 | Siddall | 176/86 L |
| 3,510,399 | 5/1970 | Terasawa et al. | 176/86 L |

Primary Examiner—Harvey E. Behrend
Attorney, Agent, or Firm—R. G. Bitner

[57] ABSTRACT

A nuclear reactor shut-down system comprising a fluidic vortex valve for releasably maintaining a liquid neutron poison outside of the reactor core, the poison being contained by a reservoir and biased by pressure for flow into poison tubes within the reactor. The upper ends of the poison tubes communicate with the supply port of the vortex valve. A continuous gas flow into the control port maintains normal controlled operation. Shut-down is effected by interruption of the control input. One embodiment comprises three groups of poison tubes and one vortex valve associated with each group wherein shut-down is effected by poison release in two out of the three groups. Preferably, each vortex valve comprises three control ports which operate on a "voting" or two-out-of-three basis. The vortex valves facilitate testing by momentary interruption of the control input and sensing poison motion.

12 Claims, 6 Drawing Figures

FLUID SHUT-DOWN SYSTEM FOR A NUCLEAR REACTOR

BACKGROUND OF THE INVENTION

This invention relates to a shut-down system for a nuclear reactor using fluidic valves.

A shut-down system is an essential part of a nuclear power reactor. Such system must possess a high degree of reliability in its operation and must be capable of shutting down the reactor in the time allowed.

It is known to shut-down a nuclear reactor by introducing a neutron poison into tubes passing through the reactor core. One such system is described in U.S. Pat. No. 3,498,881. Prior shut-down systems require activation of mechanical components to effect shut-down wherein the reliability of the entire system is dependent on the reliability of the individual components.

SUMMARY OF THE INVENTION

It is an object of the present invention to provide a shut-down system of high reliability, wherein the main shut-down controlling component has no moving parts.

Another object is to provide testability of the components and system during normal operation without altering the life of the critical components.

Another object is to provide redundancy of those components and subsystems which are subject to failure, so that failure of one component will not result in failure of the shut-down system, and to allow maintenance of the defective components during normal operation.

Another object is to provide a system which can be considered "fail safe," whereby any major failure in the shut-down system will not reduce the ability of the system to effect a complete and rapid shut-down upon demand.

The shut-down system of the present invention comprises at least one upwardly extending poison tube passing through the reactor core, a reservoir for liquid poison communicating with the lower end of the tube, means for applying pressure to the liquid in the reservoir biasing the liquid for flow into the reactor core through the poision tube, a fluidic vortex valve having a supply port, outlet port and control port, said supply port communicating with the upper end of said tube, means for supplying a continuous gaseous flow to the control port of the vortex valve which results in high impedance to flow from the supply port to the outlet port, means for applying gas pressure to the poison tube to prevent the liquid poison from entering the reactor core when the vortex valve is in the high impedance state, means for modulating the flow of gas to the control port in response to deviations of the liquid poison level in the tubes from a pre-determined level, and control means for interrupting the flow to the control port whereby the liquid poison is released into the core effecting reactor shut-down.

One specific embodiment of the invention comprises a vortex valve having three pairs of co-operating supply and control ports, and control means associated with each control port.

Another specific embodiment includes three groups of poison tubes and a vortex valve associated with each group.

The use of vortex valves which have no moving parts, and redundancy of other components which are subject to failure, provide a system of high reliability.

DESCRIPTION OF THE PREFERRED EMBODIMENTS

Figure 1:
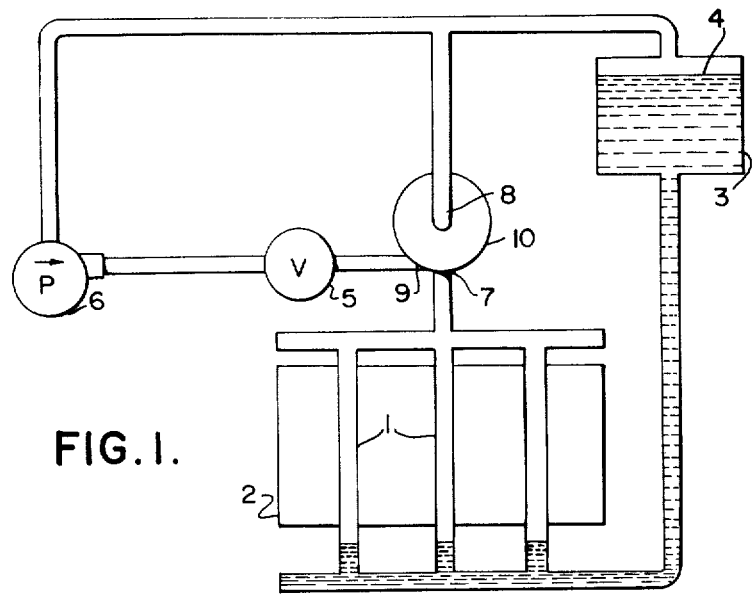
FIG. 1 is a schematic representation of the shut-down system according to the present invention.

The invention schematically illustrated in FIG. 1 comprises upwardly extending tubes 1 which pass through the reactor core 2. A reservoir 3 containing a liquid poison 4 communicates with the lower end of the tube 1. The reservoir 3 is shown at an elevation above the reactor core to provide hydrostatic pressure biasing the poison for flow into the reactor core. The fluidic vortex valve 10 includes a supply port 7, outlet port 8, and control port 9. The supply port 7 communicates with the upper end of the tubes 1. Supply means 6 supplies a gaseous flow to the control port 9 which results in high impedance to flow from the supply port 7 to the outlet port 8, and applies gas pressure to the poison tube which prevents poison from entering the reactor core area for normal operation. For shut-down, control means 5 interrupts the flow to the control port 9. The absence of flow to the control port results in the release of poison into the reactor core effecting reactor shut-down.

Figure 2:
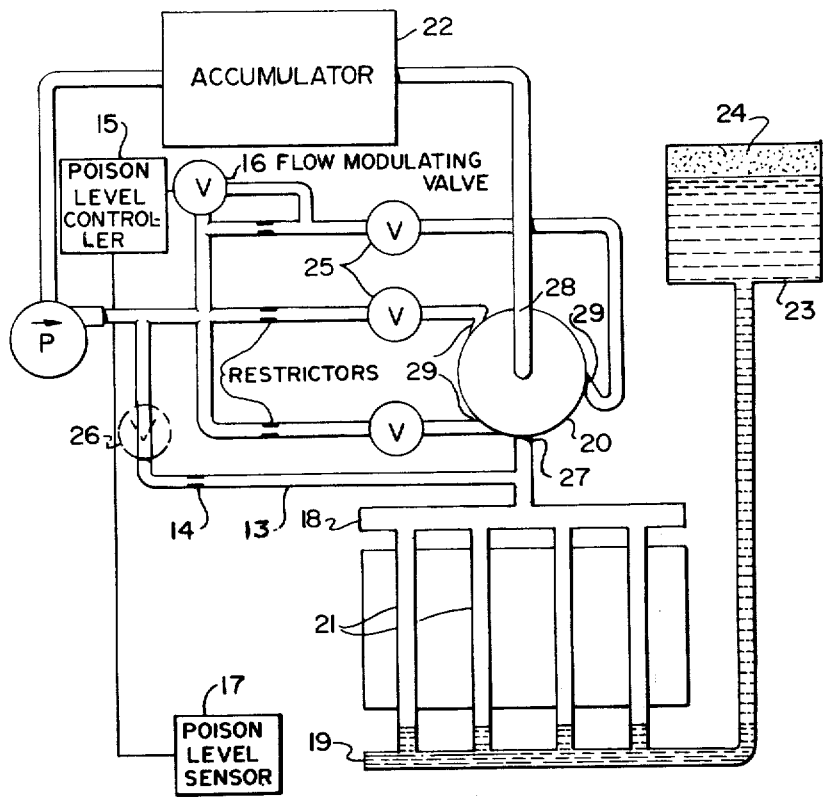
FIG. 2 schematically illustrates another embodiment of the invention.

An alternate more specific embodiment is illustrated in FIG. 2. A plurality of tubes 21 are connected with an upper header 18 and a lower header 19. The lower header 19 is connected with a reservoir 23 containing a liquid poison and the upper header is connected with the vortex valve 20. Pressure biasing the liquid for flow into the tubes 21 is provided by pressurized gas 24 in the reservoir 23 in addition to the hydrostatic pressure due to the reservoir's elevation.

The vortex valve 20 comprises a supply an outlet port 28 and three control ports 29. Control means 25 provides means for selectively interrupting the flow to each of the control ports 29.

Control of the poison level in the tubes is provided by a suitable controller 15 and a flow modulating valve 16 which superimposes a poison level controlling flow to one of three control ports 29. The controller modulates the flow in response to signals from suitable sensor 17 which senses deviations from a predetermined poison level. The modulated flow to the control port should have an upper limit so that it cannot prevent shut-down in the event that the control valve for that control line should fail to function.

An accumulator 22 ensures low pressure downstream of the outlet port 28 for shut-down.

Figure 3:
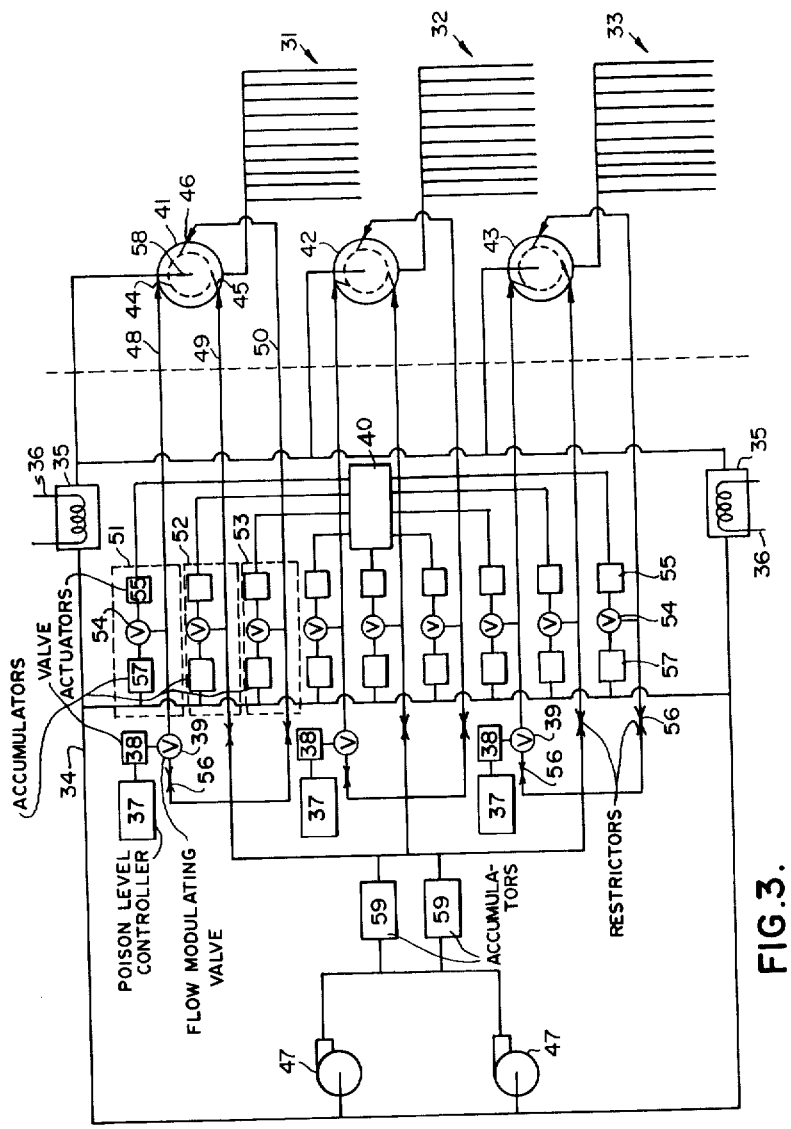
FIG. 3 schematically illustrates an embodiment of the gas subsystem.

Conduit 13 with restrictor 14 permits applying pressure directly to the poison tubes 21, circumventing the vortex valve. In the embodiment of FIGS. 1, and FIG. 3, the normal controlled operation of the vortex valve provides the pressure required at the supply port to prevent the poison from entering the reactor core. In the embodiment of FIG. 2 pressure may be applied directly to the poison tubes while the vortex valve provides the shut-down function and control of the poison level in the poison tube. Alternatively a valve 26 may be used to provide pressure through conduit 25 only for reactor start-up.

The shut-down system can be considered as made up of two subsystems, the liquid poison subsystem and the gas subsystem. The liquid poison subsystem is essentially passive, as a compressed spring, while the gas subsystem is active, as the control system.

Liquid Subsystem

With reference to FIGS. 1 or 2, the liquid poison subsystem includes the reservoir 3 or 23, the poison tubes 1 or 21 and interconnecting conduit, with the reservoir containing sufficent poison to fill the tubes for shut-down and remain in static equilibrium after the shut-down is complete.

The simplest form of providing pressure to the liquid poison 4 is to have an elevated reservoir as illustrated in FIG. 1.

Alternatively, with reference to FIG. 2, the pressure may be provided entirely, or in part, by a pressurized driving gas 24 over the poison in the reservoir 23.

During normal controlled operation the poison is prevented from entering the reactor poison tubes by the normal action of the vortex valve 20.

Following shut-down, it is desirable that the poison level in the poison tube rises to the top of the reactor core but below the vortex valve to prevent poison from entering the gas subsystem. This can be most readily accomplished by sizing the upper header 18 and the reservoir 23 such that when the pressures are equalized the common liquid level in the system is below the level of the vortex valve 20. In addition hydrodynamic braking devices may be installed in the upper portion of tubes 21 in order to decrease the velocity of the poison after the in-core portion of the tubes has been filled.

The use of an elevated reservoir as the sole means of supplying pressure has the additional advantage that the drop in the driving head in the later part of the shut-down will decelerate the poison motion slightly and thus reduce possible waterhammer effects when the poison is stopped at the top of the reactor.

The first consideration in the selection of the poison tubes will be the tube diameter consistent with available driving pressure and the required insertion time. The number of tubes to be used will be determined by the required reactivity worth of the shutdown system.

For a given poison insertion time, the resistance of liquid poison flow in the reactor poison tubes is inversely proportional to the poison tube diameter. On the other hand, for a given poison tube diameter the relative frictional resistance is inversely proportional to the square of the insertion time. That is, increasing the insertion time by a factor of 2 reduces the frictional effect by a factor of 4.

Another important cause of poison flow friction is the entrance region from the supply header to the reactor poison tubes. For a given entrance, the effect of friction losses due to entrance effects are inversely proportional to the square of the insertion time.

A compromise may be necessary to reduce the number of tubes due to either practical or economic considerations, e.g., available space within the core region, required flux distributions, etc. If a small number of large diameter tubes is required, consideration may be given to the use of annuli to reduce the volume of poison supply tank as well as the power consumption of the vortex valves.

To reduce the water hammer effects of the poison when it reaches the top of the tubes, damping means in the form of restrictions located at the top of the tubes may be used. Such means would serve to dissipate some of the poison energy while not significantly affecting the time required for the gas in the poison tubes to be discharged because of the large difference in frictional loss for a given volumetric flow rate of the gas and liquid poison.

The use of a large lower header, to which the poison tubes are connected, and a large diameter conduit to the poison supply tank is desirable to minimize frictional effects.

The header at the top of the poison tubes connecting the poison tubes to the vortex valve should be as small as practical to reduce the volume of gas which must be exhausted ahead of the poison front.

The poison temperature should not be significantly different from that of the poison tubes under normal operation in order to prevent thermal shock effects from being a design consideration.

Gas Subsystem

FIG. 3 illustrates one embodiment of the gas subsystem. The system includes three groups of poison tubes 31, 32, and 33. Associated with each group is a vortex valve 41, 42, and 43, respectively. The system is designed so that the release of poison in any two out of three groups will effect reactor shut-down under any accident condition. Each vortex valve 41 has three control ports 44, 45, and 46 which under normal operating conditions are supplied with a gas input from compressors 47 through control lines 48, 49 and 50.

Associated with each control line 48, 49, and 50 are vortex input control means 51, 52, and 53 respectively which control the flow to the respective control ports. The control means 51, 52, and 53 receive shut-down or test signals from a suitable controller 40.

One embodiment of flow control means 51 is shown in FIG. 3, which includes a control valve 54 and a valve actuator 55. Upon cessation of the normal signal to the actuator 55, the control valve 54 is opened interrupting the flow to the control port and diverting the gas input to the return line 34. With no input to the control ports, the vortex valve is switched to the low impedance state releasing the pressure in the poison tubes 31 allowing poison to enter the reactor core thereby effecting reactor shut-down.

Associated with one control line 48 of each vortex valve 41 is means to control the poison level in each group of poison tubes 31. The poison level control means comprises a flow modulating valve 39 with actuating means 38 which modulates the magnitude of flow to the control port 44 of the vortex valve. The valve 39 is modulated by a suitable controller 37 in response to signals from a poison level sensor which senses deviations from the desired level.

The flow restrictor 56 in the control line 48 serves as an impedance to restrict flow reducing the time delay between opening of the control valve and depressurization of the control line.

Accumulators 57 ensure low pressure downstream of the control valves 54 during testing or shut-down.

The accumulators 35 in the vortex output return line 34 prevents a large increase in back pressure at the vortex valve output port 58.

Heat exchangers 36 limit the increases in gas temperature due to frictional effects in the gas circuit and also increase the efficiency of the compressor 47 to condense and remove poison vapor from the gas.

Accumulators 59 serve to provide an adequate supply pressure during a switch over of compressors and will also serve as a damper on gas oscillations. Filters and heat exchangers may also be incorporated as desired.

The embodiment shown in FIG. 3 includes a number of features to increase the reliability of the overall system. The reliability of such a system is dependent on the reliability of the individual components, the redundancy of the components in the system and the testability of the components and the overall system. The reliability of components without moving parts is essentially unlimited. The only moving parts in the system are the compressors and the control means. Redundancy of components in the system permits routine maintenace work on components taken out of service temporarily as well as providing system operation in the event of a component failure. Only the vortex valves with their no moving parts are located in the containment area. The remaining components may be replaced during normal operation of the reactor. Testability of components and the overall system serves to detect failed components shortly after the component failure occurs.

Vortex Valve

The main control element in the shut-down system is the fluidic vortex valve. Under normal operation the valve, with a supply of gas to the control port, maintains the poison level below the reactor core by preventing gas in the poison tube from passing through the vortex valve. That is, with the application of a control signal, the supply port of the vortex valve presents a high impedance to flow from the poison tubes and is also used to apply gas pressure to the poison tubes to maintain the poison outside of the reactor core. Under shut-down conditions with the absence of an input to the control port, the supply port presents a fixed low impedance to flow through the tubes. Since the gas pressure must be released before the liquid poison enters the reactor core, it is desirable that the impedance be as low as possible.

Figure 5:
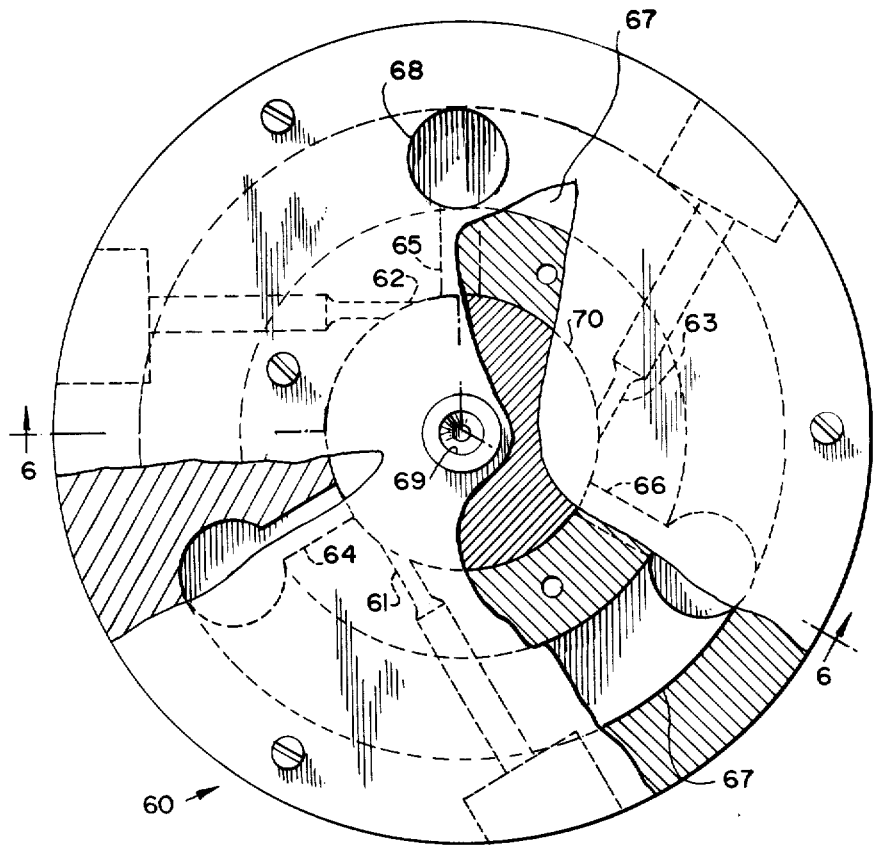
FIG. 5 is a top partially fragmented view of the vortex valve.
Figure 6:
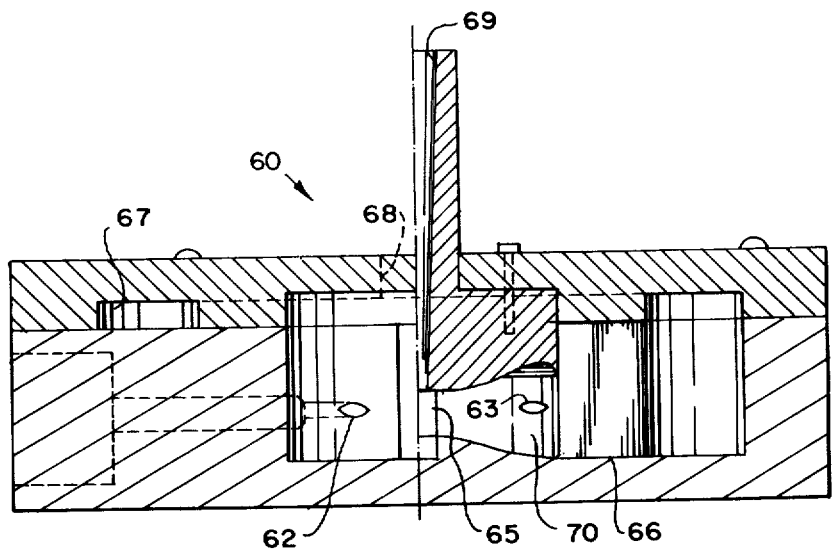
FIG. 6 is a cross-sectional view taken along line 6—6 of FIG. 5.

An embodiment of the vortex valve is shown in FIGS. 5 and 6. The vortex valve 60 comprises three control ports 61, 62, and 63 and three supply ports 64, 65, and 66. The supply ports communicate with a common supply chamber 67 which connects by means of a suitable conduit to the poison tubes at the inlet 68. The outlet port 69 is in the form of a small nozzle, which as shown in FIG. 3, communicates with the inlet of the compressor. During the normal controlled mode of operation the gas flow to the control ports 61, 62 and 63 enters the vortex chamber 70 tangentially and is discharged through the outlet port 69. The pressure field created by the rotary motion of the flow is such that no flow passes through the supply ports 64, 65, and 66 from the poison tubes. The pressure created at the supply ports may also be utilized to force the poison level outside of the reactor core region.

The vortex valve may be designed to operate as a two-out-of-three "voting" system for shut-down. That is, the absence of a control signal to two out of three control ports will switch the valve to the low impedance state for shut-down. A spurious faulty signal to one control port would not switch the vortex valve. On the other hand, failure of a single control valve to respond to a shut-down signal would permit the other two control signals to effect shut-down.

Three vortex valves are preferred as in FIG. 3. Any two out of three of these valves will cause the reactor to completely shut-down. Having only two vortex valves would require a complete duplication of all the reactor poison tubes; one set for each vortex valve. This would require more reactor core space than three vortex valves. Increasing the number of vortex valves beyond three to four or more would lead to a more complex piping and control system. Increased number of vortex valves would also lead to a reduction in the rate of independent testing of components.

Vortex Valve Control

Control of reactor shut-down is accomplished essentially by controlling the input to the control ports. Normal controlled operation of the vortex valve requires a substantially continuous flow to the control port. Interruption of the flow to the control valve by any means initiates shut-down. Hence, shut-down will take place if the control line is blocked, or opened releasing the pressure therein, or if the gas supply means fails to supply the required input.

In the system shown in FIG. 3 shut-down is initiated by opening the control line by means of the control valve 54, causing a drop in pressure at the control port and diverting the gas supply to the return line 34.

Alternatively, the control means may consist of a control valve directly in the control line 48 which would normally be open and wherein shut-down is initiated by blocking the input to the control port 44.

Another method is to use both types of control valves whereby activation of either valve would cause shut-down.

Preferably, the control valves and associated activating means are designed to operate in the fail-safe mode, such that failure results in a loss of pressure to the control port.

The control means 51 of FIG. 3 has the advantage of allowing back-flow through the control port decreasing the impedance to flow through the vortex valve during shut-down and hence decreasing shut-down time. On the other hand this arrangement requires a restrictor in each control line.

The restrictors 56 are nozzle venturi devices operating at or near a condition of choked flow. In the choked condition of flow, opening the control valve 54 will not cause any increase in flow through the restrictor. This saturation of flow rate provided by the restrictors tends to reduce the response time of the control line and also ensures an essentially constant control mass flow rate.

With reference to FIG. 3 the control valves 54 are activated by a suitable actuator 55, for example an electromechanical device which receives test or shut-down signals from a controller 40, which in turn may receive signals from sensors which detect conditions of pressure, temperature, neutron level, etc., within the reactor.

Figure 4:
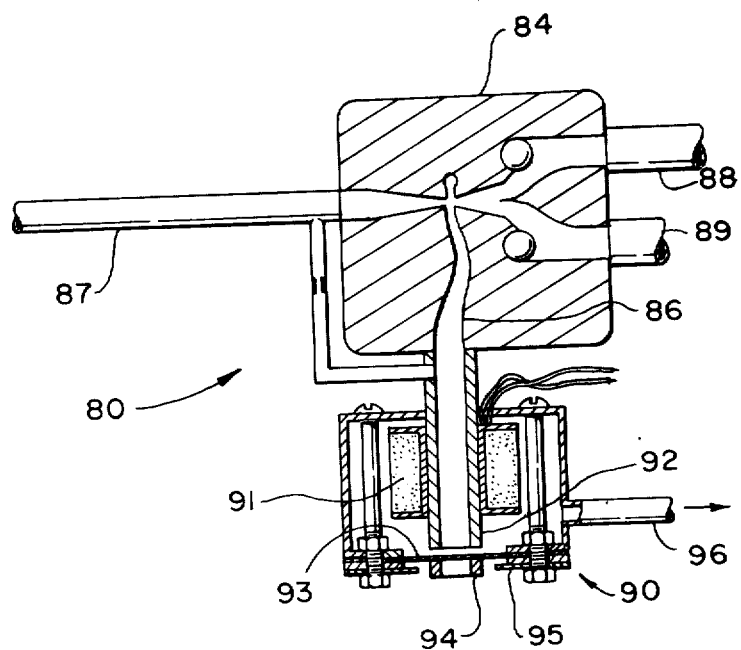
FIG. 4 shows an embodiment of the control valve.

FIG. 4 shows one embodiment of a control valve. The electrofluidic valve 80 comprises a monostable fluidic element 84 combined with an electrical actuator 90. The fluidic element 84 comprises a supply port 87, a control port 86 and outlet ports 88 and 89. The electrical actuator 90 comprises a coil 91 wound around a nozzle tube 92 which also serves as the core of an electromagnet. At the end of the nozzle tube 92 is a flapper comprising of an elastic diaphragm 93 to which is attached an annular member 94 of magnetic material. With an electrical signal present the member 94 with diaphragm 93 are pulled against the nozzle 92, increasing the back pressure which in turn switches the supply fluid from outlet 89 to outlet 88. With the elctrical signal removed, the spring effect of the diaphragm moves it away from the nozzle 92 lowering the back pressure and the fluidic element switches back to the outlet 89. The annular member 95, made of magnetic material, serves to improve the magnetic circuit.

For use in the present invention the input port 87 communicates with the gas supply means where one of the output ports 88 or 89 communicates with the control port of the vortex valve. The nozzle 92, when open, communicates with a suitable low pressure region by means of conduit 96.

Whether outlet 88 or 89 is connected with the input port of the vortex valve will depend on the mode of operation desired. The shut-down signal may be in the form of a positive electrical signal in which case outlet 89 would be used, or, the interruption of continuous electrical energization in which case outlet 88 would be connected with the vortex valve. The latter arrangement is preferred to provide fail-safe operation with respect to the electrical system.

With repeated testing the control valves will be subject to wear and fatigue since they contain moving parts undergoing cyclic shock loading over a large number of cycles. However, since the size of valve needed to perform this control function is much smaller than that needed to vent the gas from the poison tubes (i.e., the vortex valves), the shock loadings are correspondingly less than would be the case if mechanical valves were used in place of the vortex valves. Moreover, the use of electrofluidic control valves as shown in FIG. 4 provide improved reliability over conventional mechanical valves. High reliability of the shut-down system is maintained by redundancy which permits failure and replacement of individual components without affecting reactor operation.

System Testing

The use of a vortex valve permits continuous testing of the shut-down system during normal operation. It permits testing of the vortex valve itself, and also the individual control lines with their associated control means. Testing consists essentially of providing a sudden momentary reduction in the input to the control port of the vortex valve to cause a small drop in pressure in the poison tube but of limited duration so that the poison does not enter the reactor core.

The control lines may be tested individually by detecting a drop in pressure in the control lines in response to a test signal. Sequential testing may be provided by a suitable controller.

The operation of the vortex valve or the entire shut down system can be checked by momentarily applying a shut-down signal and detecting motion of the poison with suitable sensors.

Design Consideration

The shut-down system may be designed around two main requirements. The first is insertion time, which is the time elapsed from initiation of a shut-down signal until the poison tubes are filled with poison. The insertion time will be dictated by the fuel design, the rate of reactor power decrease in the presence of the poison, and the "worst conceivable" accident conditions. The second requirement is the "reactivity worth" of the poison. Sufficient poison must be injected into the poison tubes within the core to ensure a decrease in reactivity level under all possible conditions.

Once values for insertion time and reactivity worth have been specified, a decision as to the driving pressure of the poison is made.

The choice of poison tube diameter represents a compromise among several factors. For a given insertion time, the required driving pressure decreases with increasing tube diameter. Also, the manufacturing cost of a few large tubes compared to a larger number of small tubes having the same reactivity worth must be considered. Finally, the volume of poison needed to provide a given reactivity worth in the system increases with increasing tube diameter.

The number and size of poison tubes must be such as to provide the specified "reactivity." The volumetric flow rate of poison can now be calculated. With this information the poison reservoir and vortex valve size can be designed.

The vortex valve size, or the nozzle exit area of the outlet port, will be proportional to the volumetric flow rate and large enough that the gas pressure decay time should not contribute substantially to the overall dynamics of the poison motion. The control port area will be proportional to the nozzle exit area. The pressure to the control port will be somewhat greater than the poison driving pressure such that the resulting pressure applied at the supply port will balance the poison pressure and hold the poison at the desired level in the tubes.

A suitable gas for the gas subsystem is helium. Helium expands less than air for a given pressure drop under an isentropic expansion and also, with its lower density, helium can be accelerated faster than air. These properties of helium increase the discharge rate from the poison tubes and therefore decrease the poison insertion time. A suitable poison material is a solution of about 2.3 molar ammonium borate in water. Other borate salts or other highly neutron absorbing materials such as gadolinium or cadmium compounds may also be considered.

What is claimed is

1. A shut-down system for a nuclear reactor comprising:
   a. at least one upwardly extending poison tube passing through the reactor core, said tube having an upper and lower end;
   b. a reservoir for liquid poison communicating with the lower end of said tube;
   c. means for applying pressure to the liquid in the reservoir biasing the liquid for flow into the reactor core through said poison tube;
   d. a fluidic vortex valve having a supply port, outlet port and control port, said supply port communicating with the upper end of said tube;

e. gas supply means for supplying a substantially continuous flow to the control port of the vortex valve which results in high impedance to flow from the supply port to the outlet port;

f. means for applying gas pressure to the poison tube for preventing the poison from entering the reactor core when the vortex valve is in the high impedance state;

g. means for modulating the flow of gas to said control port in response to deviations of the liquid poison level in said tubes from a predetermined level, in order to maintain the poison at the predetermined level; and h. control means for interrupting the flow to the control port whereby the vortex valve is switched to a low impedance state allowing release of gas pressure from the poison tube such that the liquid poison enters the core effecting reactor shut-down.

2. The apparatus of claim 1 wherein said vortex valve includes three radially inwardly directed supply ports, a manifold chamber interconnecting the three supply ports with the upper end of said poison tube, a tangentially inwardly directed control port operatively associated with each supply port, a control line interconnecting the gas supply source with each control port, and control means associated with each control line.

3. The apparatus of claim 2 having three groups of poison tubes and one vortex valve associated with each group of tubes.

4. The apparatus of claim 2 wherein the flow modulating means comprises a flow modulating device associated with one of the three control lines.

5. The apparatus of claim 2 wherein the vortex valve is switched to the low impedance state by the absence of an input to two out of three control ports.

6. The apparatus of claim 3 wherein shut-down is initiated by the release of poison into two out of three groups of poison tubes.

7. The apparatus of claim 1 wherein said means for applying gas pressure to the poison tube is provided by the operation of the vortex valve in its high impedance state.

8. The apparatus of claim 1 wherein said means for applying gas pressure to the poison tube is provided by a conduit interconnecting the poison tubes with the gas supply means, said conduit having flow restricting means associated therewith.

9. The apparatus of claim 1 includes a control line interconnecting the gas supply means and the control port, and wherein said control means comprises a control valve associated with said control line for releasing the pressure from within the control line thereby interrupting the flow to the control port.

10. The apparatus of claim 8 including flow restricting means associated with the control line between the gas supply means and said control means.

11. The apparatus of claim 1 including means for momentarily interrupting the flow to the control port for a time insufficient to effect reactor shut-down, and means for detecting motion of the poison to provide an indication of the operation of the shut-down system.

12. The apparatus of claim 2 including testing means for repeatedly directing signals of limited duration to each of said control means, and sensing means for detecting operation of said control means.

* * * * *